(12) United States Patent  
Yamaguchi et al.

(10) Patent No.: US 12,296,763 B2
(45) Date of Patent: May 13, 2025

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Koji Yamaguchi, Mie (JP); Hirokazu Komori, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 269 days.

(21) Appl. No.: 17/924,825

(22) PCT Filed: May 10, 2021

(86) PCT No.: PCT/JP2021/017639
§ 371 (c)(1),
(2) Date: Apr. 3, 2023

(87) PCT Pub. No.: WO2021/241178
PCT Pub. Date: Dec. 2, 2021

(65) Prior Publication Data
US 2023/0226989 A1    Jul. 20, 2023

(30) Foreign Application Priority Data
May 28, 2020  (JP) .................. 2020-093301

(51) Int. Cl.
H02G 3/04   (2006.01)
B60R 16/02  (2006.01)
H02G 3/22   (2006.01)

(52) U.S. Cl.
CPC ....... *B60R 16/0222* (2013.01); *H02G 3/0437* (2013.01); *H02G 3/22* (2013.01)

(58) Field of Classification Search
None
See application file for complete search history.

(56) References Cited

U.S. PATENT DOCUMENTS 6,051,790 A      4/2000  Takeuchi et al.
11,878,641 B2 *  1/2024  Yamaguchi .......... H02G 3/0616
2002/0113460 A1* 8/2002  Murakami .......... B60R 16/0207
                                                         296/152

FOREIGN PATENT DOCUMENTS

JP   S62-140832 U    9/1987
JP   104-118807 U    10/1992
(Continued)

OTHER PUBLICATIONS

International Search Report issued on Jun. 29, 2021 for WO 2021/241178 A1 (6 pages).

*Primary Examiner* — Krystal Robinson
(74) *Attorney, Agent, or Firm* — Venjuris, P.C.

(57) ABSTRACT

One object is to provide a technology that can increase the versatility of a wiring module in which a grommet is provided in a wiring member. The wiring module includes a wiring member connecting a vehicle body and a door panel, and a grommet attached to the wiring member. The grommet includes a base portion fixed at a certain position with respect to the door panel. The wiring member includes a first section and a second section that is located on the vehicle body side relative to the first section and is covered by the base portion. The first section of the wiring member is (Continued)

covered by a protective portion capable of at least one of bending deformation and stretching deformation.

10 Claims, 15 Drawing Sheets

(56) References Cited

FOREIGN PATENT DOCUMENTS

| | | | |
|---|---|---|---|
| JP | H06-223645 A | | 8/1994 |
| JP | 2000-217229 A | | 8/2000 |
| JP | 2002-027640 A | | 1/2002 |
| JP | 2014-230323 A | | 12/2014 |
| JP | 2019139976 A | * | 8/2019 |

* cited by examiner

WIRING MODULE

CROSS REFERENCE TO RELATED APPLICATIONS

This application is a national phase of PCT application No. PCT/JP2021/017639, filed on 10 May 2021, which claims priority from Japanese patent application No. 2020-093301, filed on 28 May 2020, all of which are incorporated herein by reference.

TECHNICAL FIELD

The present disclosure relates to a wiring module.

BACKGROUND

A grommet is usually attached to a wiring member that connects a door and a vehicle body. Structures for attachment of a grommet and a door panel include a structure in which a grommet is passed through a through hole formed in a door panel, for example, as described in Patent Document 1, and a structure in which a grommet is disposed along a surface of a door panel, for example, as described in Patent Document 2. Grommets such as that described in Patent Document 2 are also called "through-less grommets" because they do not need to be passed through a through hole formed in a door panel unlike the grommet described in Patent Document 1.

PRIOR ART DOCUMENT

Patent Document

Patent Document 1: JP 2000-217229 A
Patent Document 2: JP 2002-027640 A

SUMMARY OF THE INVENTION

Problems to be Solved

The position where a grommet is attached in a door panel may vary depending on the vehicle model, grade, etc. If the position of the grommet is changed, the portion of the wiring member that extends from the grommet and along the door may also need to be redesigned.

Therefore, one object is to provide a technology that can increase the versatility of a wiring module in which a grommet is provided in a wiring member.

Means to Solve the Problem

A wiring module of the present disclosure is a wiring module including a wiring member connecting a vehicle body with a door panel, and a grommet attached to the wiring member, in which the grommet includes a base portion fixed at a certain position with respect to the door panel, the wiring member includes a first section and a second section that is located on a vehicle body side relative to the first section and is covered by the base portion, and the first section of the wiring member is covered by a protective portion capable of at least one of bending deformation and stretching deformation.

Effect of the Invention

The present disclosure can increase the versatility of a wiring module in which a grommet is provided in a wiring member.

DETAILED DESCRIPTION TO EXECUTE THE INVENTION

Description of Embodiments of Present Disclosure

Figure 1:
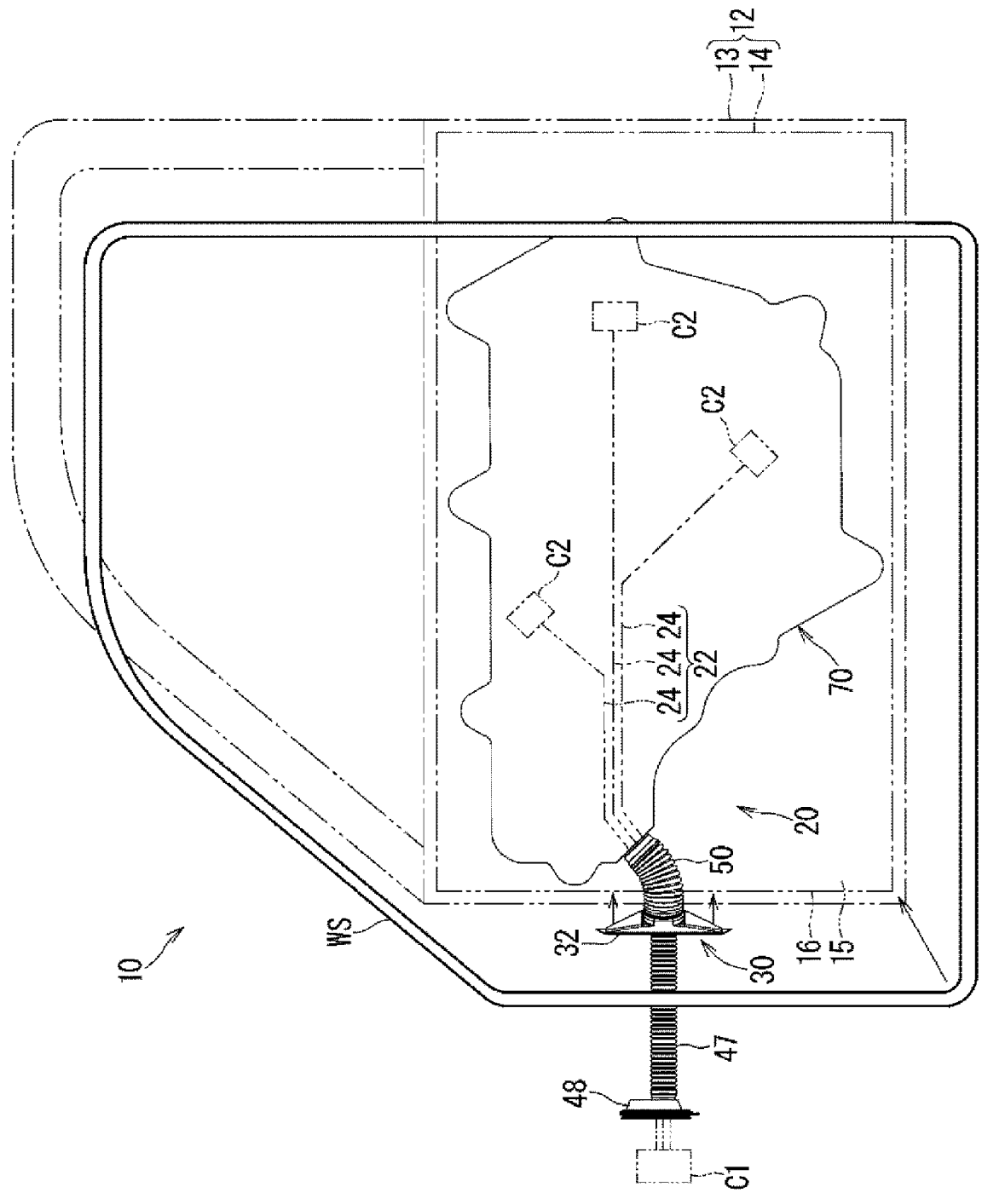
FIG. 1 is a schematic plan view showing a wiring module according to Embodiment 1 and a door panel to which it is attached.

First, embodiments of the present disclosure will be listed and described.

The wiring module of the present disclosure is as follows:

(1) A wiring module including: a wiring member connecting a vehicle body and a door panel; and a grommet attached to the wiring member, in which the grommet includes a base portion fixed at a certain position with respect to the door panel, the wiring member includes a first section and a second section that is located on a vehicle body side relative to the first section and is covered by the base portion, and the first section of the wiring member is covered by a protective portion capable of at least one of bending deformation and stretching deformation. If the position where the grommet is attached to the door panel is changed, the length of the section of the wiring member extending from the grommet toward an inner plate portion of the door panel changes, or a bent portion in the section extending from the grommet toward the inner plate portion of the door panel changes. Even in this case, since the first section of the wiring member is covered by the protective portion, which is capable of at least one of bending deformation and stretching deformation, even if the position at which the grommet is attached to the door panel changes, the protective portion can accommodate the difference in position by deforming, and thus the versatility of the wiring module can be increased.

(2) In the wiring module of (1), the protective portion may be formed in a tubular shape. As a result, the entire periphery of the first section can be covered by the protective portion, improving the protection of the first section.

(3) In the wiring module of (1) or (2), the protective portion may be formed in a bellows shape along its longitudinal direction and capable of both bending deformation and stretching deformation. This makes it easy to accommodate different positions at which the grommet is attached to the door panel.

(4) In the wiring module of any one of (1) to (3), the protective portion may be provided as part of the grommet so as to extend from the base portion. In this way, the protective portion does not have to be a separate member from the grommet 30, and thus it is possible to suppress an increase in the number of parts.

(5) The wiring module of any one of (1) to (3) may further include a protective member that is a separate member from the grommet and includes the protective portion. In this way, the protective portion does not have to be integral with the grommet, and thus it is possible to suppress a case in which the shape of the grommet becomes complex.

(6) The wiring module of any one of (1) to (5) may further include a protector that is more rigid than the grommet and is attached to the grommet, in which the protector may include a base attachment portion attached to the base portion, the base portion may include a base plate portion extending along the door panel and a rib protruding toward the door panel from a surface of the base plate portion that faces the door panel, the base attachment portion may be formed in a flat plate shape corresponding to the base plate portion, and the base attachment portion and the base portion may be attached to each other by fitting a ridge portion formed on one of an outer peripheral surface of the base attachment portion and an inner peripheral surface of the rib of the base portion into a recessed groove formed in the other. This facilitates the attachment of the protector and the base portion.

(7) In the wiring module of (6), the grommet may further include a tubular connecting portion that connects the base portion and the protective portion, and the protector may further include a tubular portion that is provided on a portion of a peripheral edge of the base attachment portion and fits into the connecting portion. This makes it more difficult for the protector to detach from the grommet when the protective portion is deformed.

(8) In the wiring module of (7), the tubular portion and the connecting portion may be attached to each other by fitting an annular protruding portion formed on one of an outer peripheral surface of the tubular portion and an inner peripheral surface of the connecting portion into an annular recessed portion formed in the other. This facilitates the attachment of the tubular portion and the connecting portion.

(9) The wiring module of any one of claims of (1)-(8) may further include a fixing component for positioning a leading end portion of the protective portion on the door panel. As a result, a base end portion of the protective portion is fixed to the door panel via the base portion, while the leading end portion is fixed to the door panel via the fixing component. This facilitates the deformation of the protective portion when one of the base portion and the fixing member is first fixed to the door panel and then the other of the base portion and the fixing member is fixed to the door panel.

(10) In the wiring module of (9), the fixing component may be a planar member that extends along an inner plate portion of the door panel, and the planar member may include a main plate portion that holds a section of the wiring member that extends along the inner plate portion, and a protective portion attachment portion that is provided on a portion of a peripheral edge of the main plate portion and to which the leading end portion of the protective portion is attached. The portion of the wiring member that extends along the door panel is held by the grommet and the planar member. As a result, most of the portion of the wiring member that extends along the door panel extends along a predetermined path, and thus it is possible to achieve an improvement in the assemblability of the wiring member.

(11) In the wiring module of any one of (1)-(10), the protective portion may be capable of at least stretching deformation, and when the protective portion is at its natural length, an extra length may occur in a section of the wiring member that includes the first section. As a result, the section that includes the first section is longer than the natural length of the protective portion, and the wiring member can easily accommodate the expansion and contraction of the protective portion.

DETAILS OF EMBODIMENTS OF PRESENT DISCLOSURE

Specific examples of the wiring module of the present disclosure will be described below with reference to the drawings. The present disclosure is not limited by these examples but indicated by the claims, and all changes that come within the claims and the meaning and range of equivalency of the claims are intended to be encompassed within the scope of the invention.

Embodiment 1

The following describes a wiring module according to Embodiment 1.

Door

First, a door of a vehicle will be described with reference to FIG. 1. FIG. 1 is a schematic plan view showing a wiring module 20 according to Embodiment 1 and a door panel 12 to which it is attached.

The door 10 is generally formed in a flat shape, and is a part of a vehicle that can be opened and closed to separate the inside and the outside of the vehicle. The open and closed states of the door 10 of the vehicle will be hereinafter simply referred to as the open and closed states. The door 10 is assumed to be a driver side door, a passenger side door, a rear seat door, or the like. The door 10 will be hereinafter described as being a side door. The door may be a rear door or the like. The door 10 will be described as a hinged door. The door may be a sliding door or the like. The door 10 includes a door panel 12 and a wiring module 20.

The door panel 12 includes an outer panel 13 and an inner panel 14. The outer panel 13 is provided on the portion of the door 10 that faces the outside of the vehicle and constitutes the outside appearance of the vehicle together with the body. The inner panel 14 is provided on the cabin side of the outer panel 13. The inner panel 14 includes an inner plate portion 15 and a side plate portion 16. The inner plate portion 15 is the portion that faces the cabin in the closed state. Provided between the inner plate portion 15 and the outer panel 13 is a space that can accommodate a window, electrical devices, and the like. For example, an opening is formed in the inner plate portion 15 to allow access to the space. The side plate portion 16 is a portion extending from an edge of the inner plate portion 15 towards the outer panel 13. Here, in particular, the side plate portion 16 extends from, among the edges of the inner plate portion 15, the edge located on the front side of the vehicle (the side of the hinged door where the hinges are provided). The side plate portion 16 defines a space that can accommodate a window, electrical devices, and the like.

The wiring module 20 is incorporated into the door 10. The wiring module 20 includes a wiring member 22 and a grommet 30. The wiring module 20 is provided with a protective portion 50. The protective portion 50 is described here as being provided as part of the grommet 30. Furthermore, here, the wiring module 20 includes a planar member 70.

The wiring member 22 is a component that supplies power to the devices incorporated in the door 10 and transmits signals between the devices incorporated in the door 10 and the devices incorporated in the vehicle body. Here, the wiring member 22 includes a plurality of electric wires 24. The wiring member 22 may include an optical fiber cable. Although the route and connection counterparts of the wiring member 22 in the vehicle are not particularly limited, for example, the routes and connection counterparts below are conceivable. That is, one end of the wiring member 22 is disposed on the vehicle body. A connector C1 is provided on the one end of the wiring member 22. This connector C1 is connected to a vehicle body side connector provided on a vehicle-side wiring member that extends from a battery, an electronic control unit, and the like. The other ends of the wiring member 22 are disposed on the door 10. The other ends of the wiring member 22 are connected to devices incorporated in the door 10. The wiring member 22 may be, for example, connected to the devices provided in the door 10 via connectors. In this case, connectors C2 may preferably be provided on the other ends of the wiring member 22.

An intermediate portion of the wiring member 22 is strung between the vehicle body and the door 10. More particularly, the wiring member 22 extends from the one end to the other ends from a through hole provided in the vehicle body and toward the side plate portion 16 of the door panel 12. Upon reaching the side plate portion 16, the wiring member 22 extends along the door panel 12 from the side plate portion 16 toward the inner plate portion 15.

The section of the wiring member 22 from the through hole provided in the vehicle body to the inner plate portion 15 via the side plate portion 16 is covered and protected by the grommet 30. A plurality of electric wires 24 extends integrally in the portion of the wiring member 22 in which the grommet 30 is provided. The section of the wiring member 22 from the side plate portion 16 to the inner plate portion 15 is covered by a base portion 32 and the protective portion 50 of the grommet 30. The wiring member 22, after reaching the inner plate portion 15, extends out of the protective portion 50. The plurality of electric wires 24 branches off on the inner plate portion 15 and extends to the positions of the devices to which they are connected. The portion of the wiring member 22 extending out of the protective portion 50 is held by the planar member 70. The planar member 70 holds the wiring member 22 in the branching paths.

The grommet 30 is a so-called through-less grommet. The grommet 30 is attached to the door panel 12 so as to traverse a portion of the peripheral edge of the inner panel 14. The grommet 30 is attached to the side panel portion 16. The grommet 30 includes the base portion 32. The base portion 32 is attached to the side plate portion 16. The base portion 32 is fixed to the door panel 12 at a certain position. In the grommet 30, a protective tube portion 47 extends from the base portion 32 toward the vehicle body. A vehicle body attachment portion 48 is provided at the leading end of the protective tube portion 47. The vehicle body attachment portion 48 is fixed to the vehicle body. The protective portion 50 extends from the base portion 32 toward the rear end of the door 10. The protective portion 50 is capable of at least one of bending deformation and stretching deformation. When the wiring module 20 is fixed to the inner plate portion 15 and the side plate portion 16, the length between the position at which it is fixed to the inner plate portion 15 and the position at which it is fixed to the side plate portion 16, the relative position, and the like may vary depending on the vehicle model, grade, and the like. As the protective portion 50 deforms, the difference in the length between the position at which it is fixed to the inner plate portion 15 and the position at which it is fixed to the side plate portion 16, the difference in its relative position, and the like are absorbed.

Figure 7:
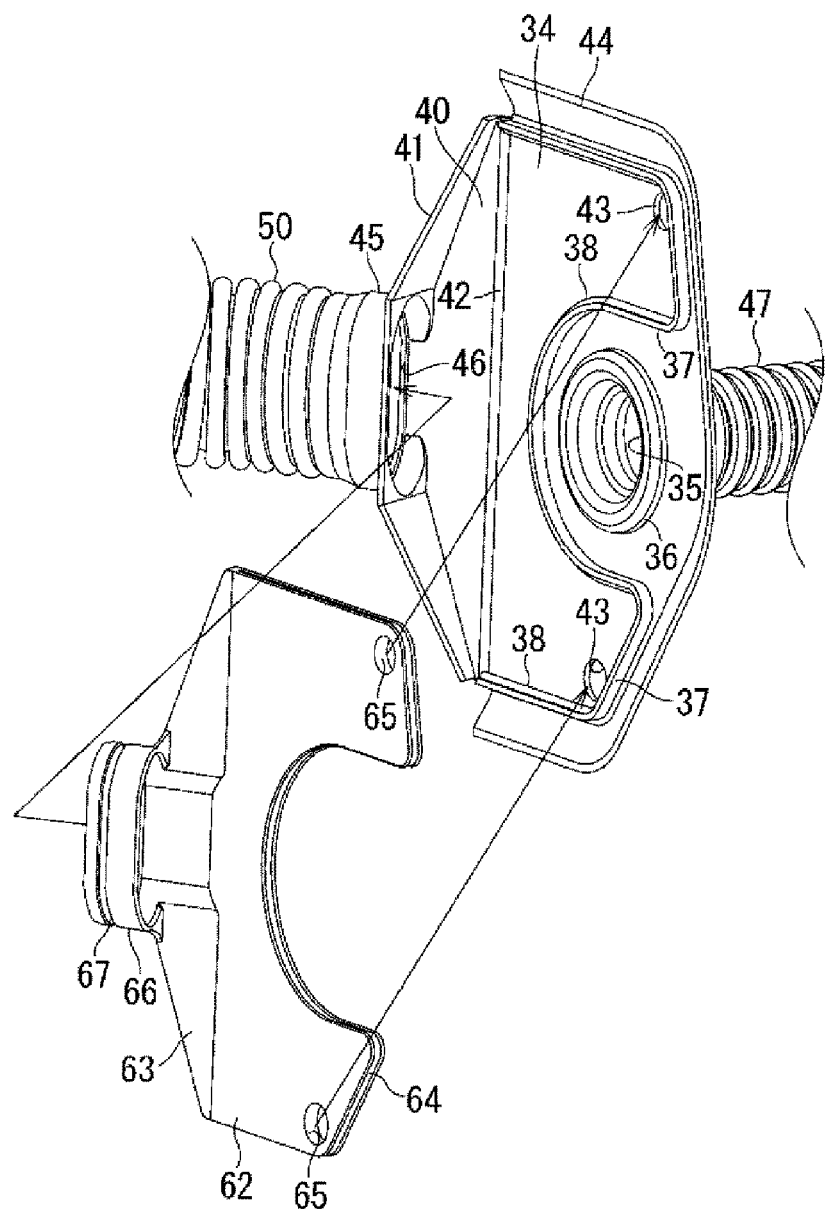
FIG. 7 is an exploded perspective view of the grommet and the protector.

Here, a protector 60 is attached to the grommet 30 (see FIG. 7). The grommet 30 is a molded article made of an elastic material such as an elastomer and is easily deformable. The protector 60 is a molded article made of a resin or metal, and is more rigid than the grommet 30. The protector 60 is attached to the portion of the grommet 30 that is desired to be of a certain shape, so as to restrict the deformation of that portion.

The planar member 70 holds the portion of the wiring member 22 that extends out of the protective portion 50. The planar member 70 is provided on the cabin side of the door panel 12 in the door 10. The planar member 70 is a component that extends in a planar shape across the door panel 12. For example, the planar member 70 is disposed between the door panel 12 and the design trim on the door 10. The planar member 70 is a flat component that extends about as much as or larger than an opening formed in the inner plate portion 15, for example. The planar member 70 is attached to the door panel 12 so as to close the opening formed in the inner plate portion 15. The planar member 70 is attached to the inner panel 14, for example, by means of screwing, engagement structures, and the like. For example, if portions of the peripheral edge of the planar member 70 that overlap the inner panel 14 are fixed to the inner panel 14 by fastening screws or the like, the gap therebetween can be maximally sealed.

In addition to the above-described devices to which the wiring member 22 is connected, for example, a weather strip WS and a design trim that are not shown in the figures are also incorporated in the door 10.

The weather strip WS is attached to the door panel 12 so as to extend along the peripheral edge thereof. For example, the weather strip WS shown in FIG. 1 is attached to the door panel 14 so as to extend along the peripheral edge thereof and surround the door panel 12. The weather strip WS has a portion that traverses a surface of the grommet 30. Normally, the weather strip WS is sandwiched between the vehicle body and the door panel 12 in the closed state where it is compressed or otherwise deformed. In the closed state, the grommet 30 supports the deformed portion of the weather strip WS that traverses the grommet 30.

The design trim is provided on the portion of the door 10 that faces the cabin and constitutes the interior appearance of the vehicle. For example, door handles, operation portions for vehicle-mounted devices, and the like are attached to the design trim. The portion of the wiring member 22 that extends from the grommet 30 and along the inner plate portion 15 and the planar member 70 are covered by the design trim.

Figure 2:
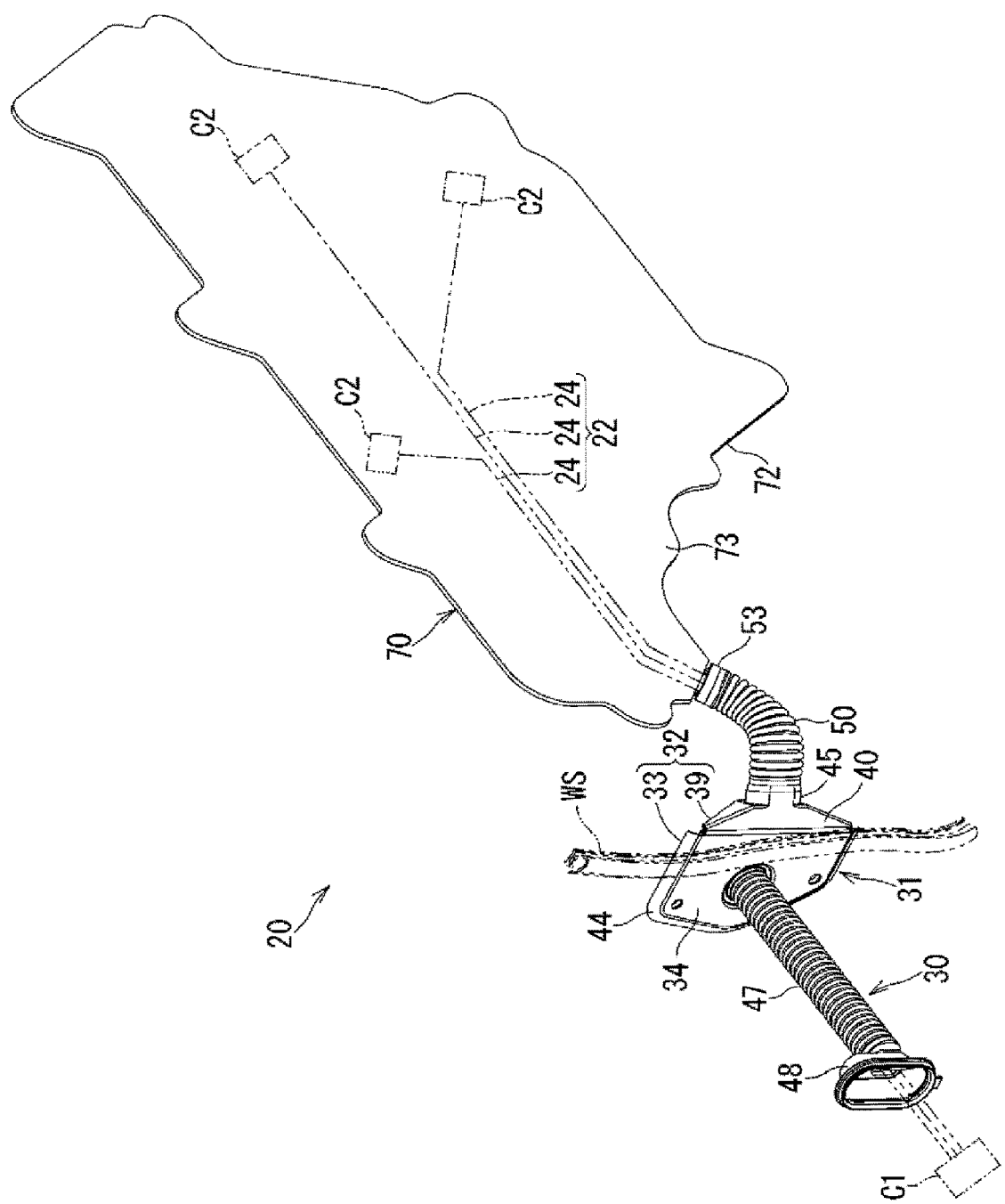
FIG. 2 is a perspective view showing the wiring module according to Embodiment 1.
Figure 3:
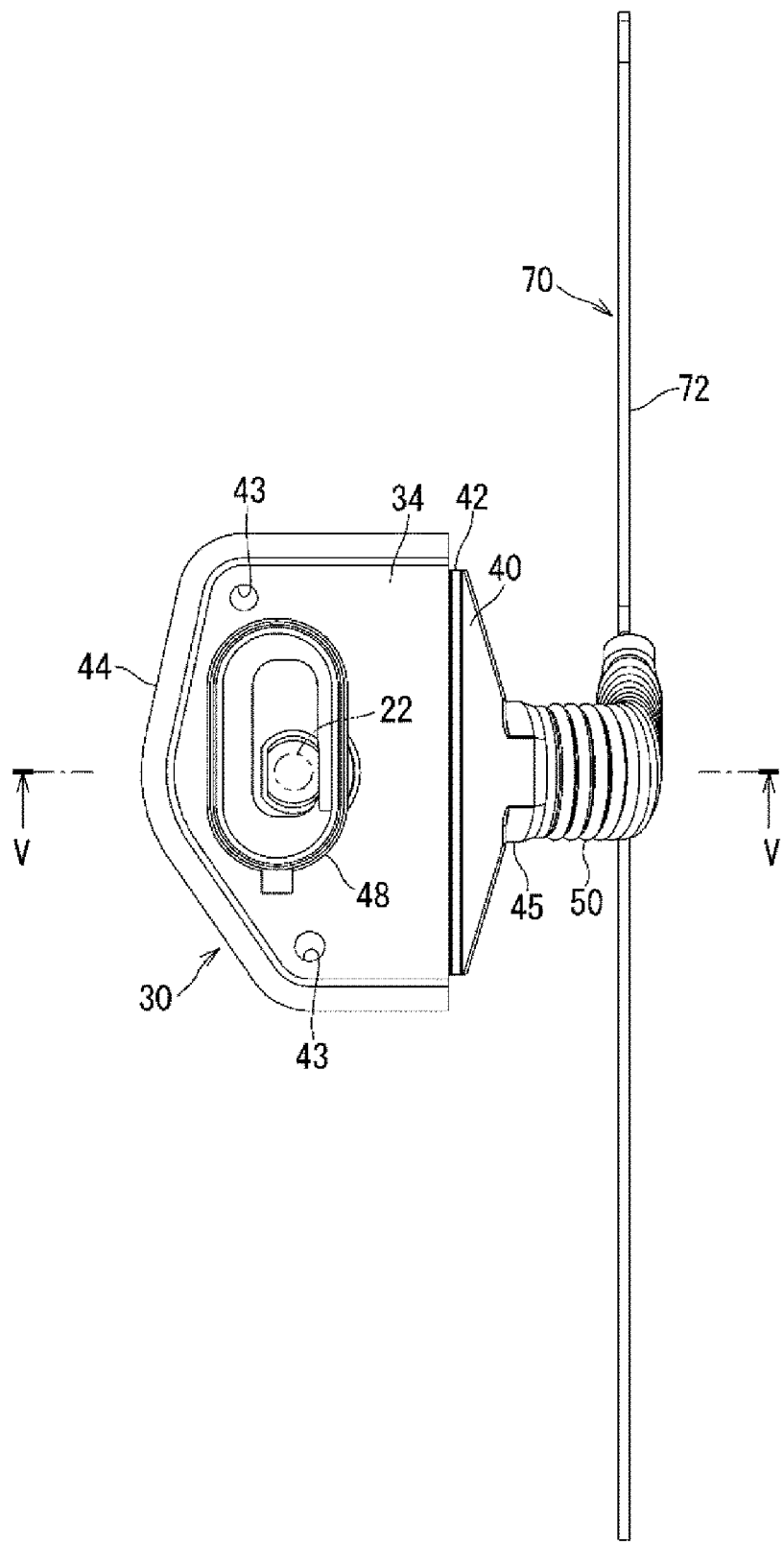
FIG. 3 is a front view showing the wiring module according to Embodiment 1.
Figure 4:
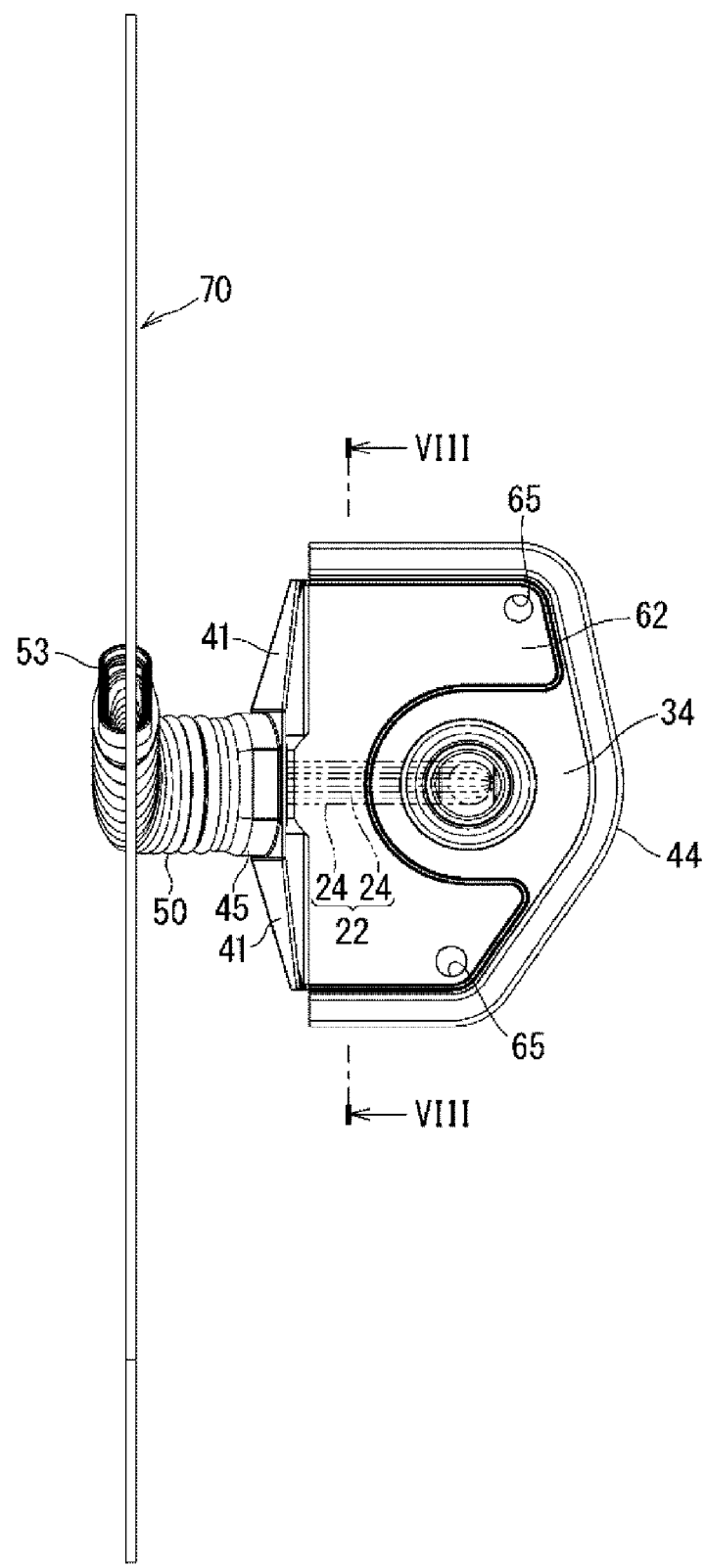
FIG. 4 is a rear view showing the wiring module according to Embodiment 1.
Figure 5:
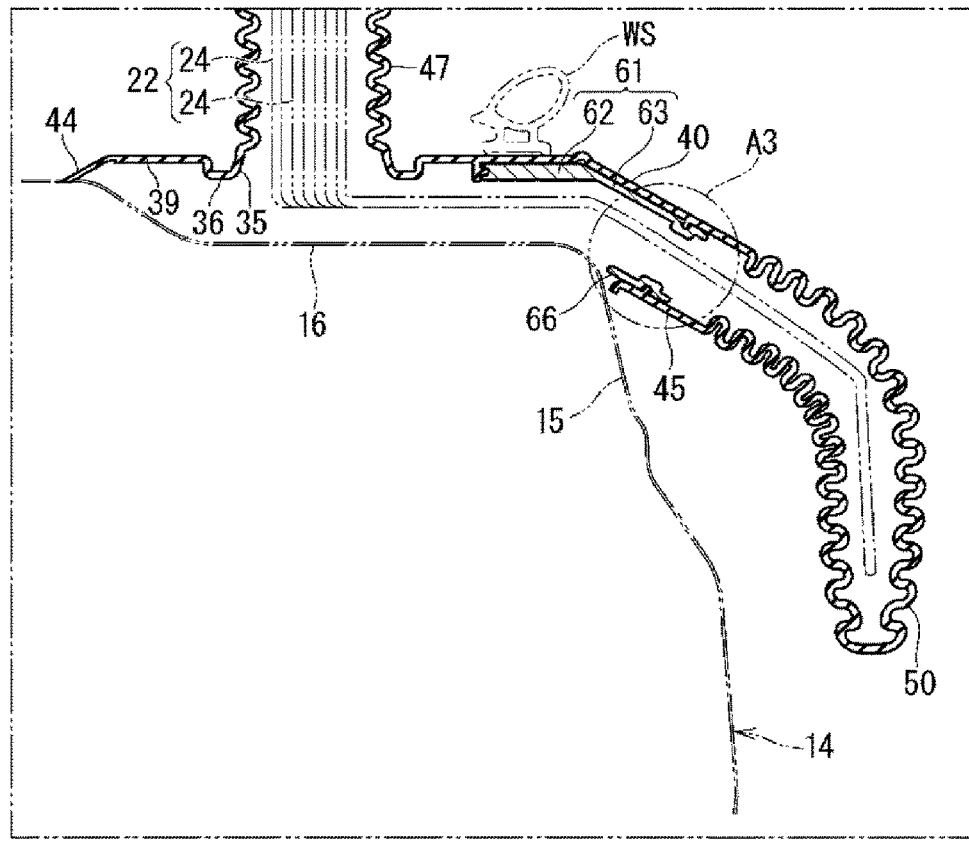
FIG. 5 is a cross-sectional view cut along line V-V of FIG. 3.

The following describes each member of the wiring module 20 in detail. First, the wiring member 22 will be described in detail with reference to FIGS. 2 to 5 in addition to FIG. 1. FIG. 2 is a perspective view showing the wiring module 20 according to Embodiment 1. FIG. 3 is a front view showing the wiring module 20 according to Embodiment 1. FIG. 4 is a rear view showing the wiring module 20 according to Embodiment 1. FIG. 5 is a cross-sectional view cut along line V-V of FIG. 3.

Wiring Member

It is assumed that the wiring member 22 has a first section, a second section, a third section, and a fourth section. The first section is the section covered by the protective portion 50. The second section is located on the vehicle body side relative to the first section and is covered by the base portion 32 of the grommet 30. The third section is the section covered by the protective tube portion 47. Since the protective portion 50 is provided here as a part of the grommet 30, the first, second, and third sections are the sections to which the grommet 30 is attached. The fourth section is the section held by the planar member 70. Here, the first to fourth sections are arranged from one end on the vehicle body side to the other end on the door 10 side in the order of the third section, the second section, the first section, and the fourth section.

The transverse cross-sectional shape of each section of the wiring member 22 may be formed according to the position at which it is disposed. For example, in the third section of the wiring member 22, the plurality of electric wires 24 are bundled so that the transverse cross-sectional shape is as close to a circular shape as possible. As a result, the third section of the wiring member 22, which is passed through the protective tube portion 47, can easily conform to the deformation of the protective tube portion 47. The fourth section of the wiring member 22 is made flat by arranging the plurality of electric wires 24 in one direction (the vertical direction here). As a result, in the fourth section of the wiring member 22, which is held by the planar member 70, the height dimension from the door panel 12 is limited. In the first section, the plurality of electric wires 24 are bundled so that the transverse cross-sectional shape of the plurality of electric wires 24 is closer to a flat shape than in the third section and is closer to a circular shape than in the fourth section. As a result, in the first section of the wiring member 22, which is covered by the protective portion 50, the height from the door panel 12 is minimized while the wiring member 22 can easily conform to the deformation of the protective portion 50. The second section of the wiring member 22 may be flat as in the fourth section, or may be bundled to approach a circular shape as in the third section, or may be bundled to approach a flat shape as in the first section. However, the transverse cross-sectional shape of the wiring member 22 in each section can be set as desired. For example, the transverse cross-sectional shape of the wiring member may be flat in the first and third sections. For example, bundling may be performed such that the transverse cross-sectional shape of the wiring member approaches a circular shape in the second and fourth sections.

When the transverse cross-sectional shapes of the wiring member 22 are different in adjacent sections, the transverse cross-sectional shape of the wiring member 22 changes at or near the boundaries of the adjacent sections. For example, at the boundary between the first section and the fourth section, the shape of the wiring member 22 is transformed from a shape in which the plurality of electric wires 24 are flatly bundled to a shape in which the plurality of electric wires 24 are arranged in a row.

Figure 6:
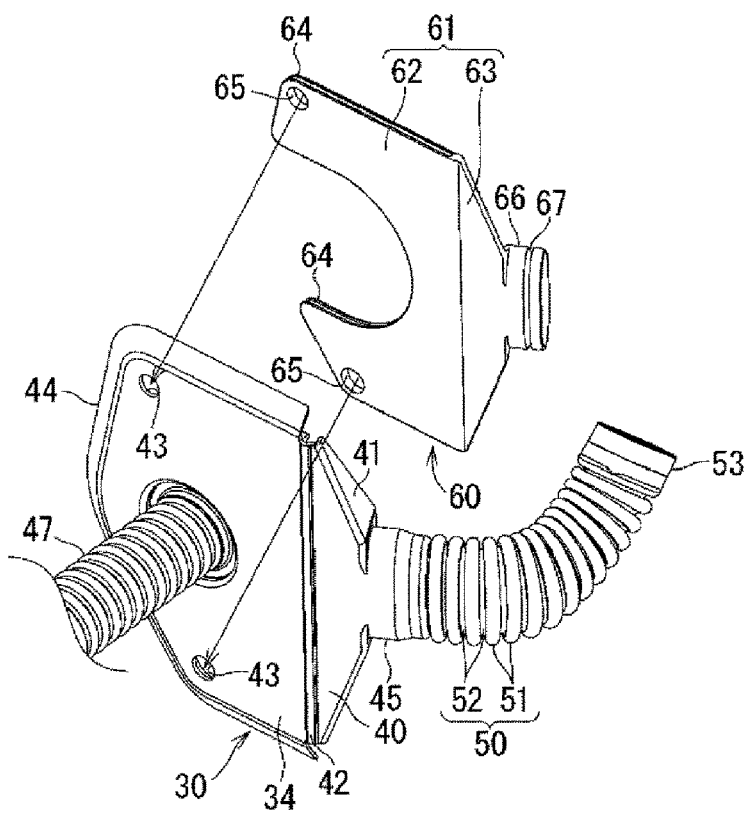
FIG. 6 is an exploded perspective view of a grommet and a protector.
Figure 8:
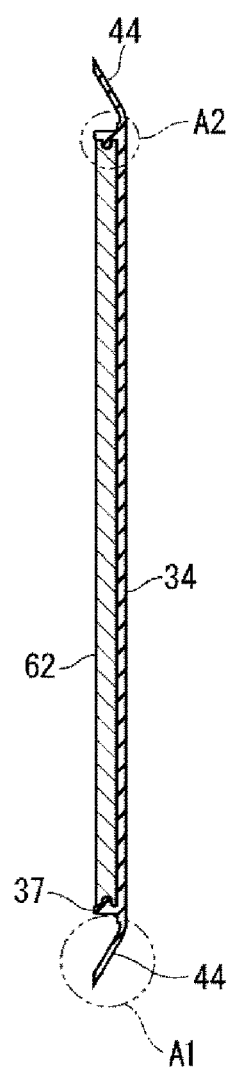
FIG. 8 is a cross-sectional view cut along line VIII-VIII of FIG. 4.
Figure 9:
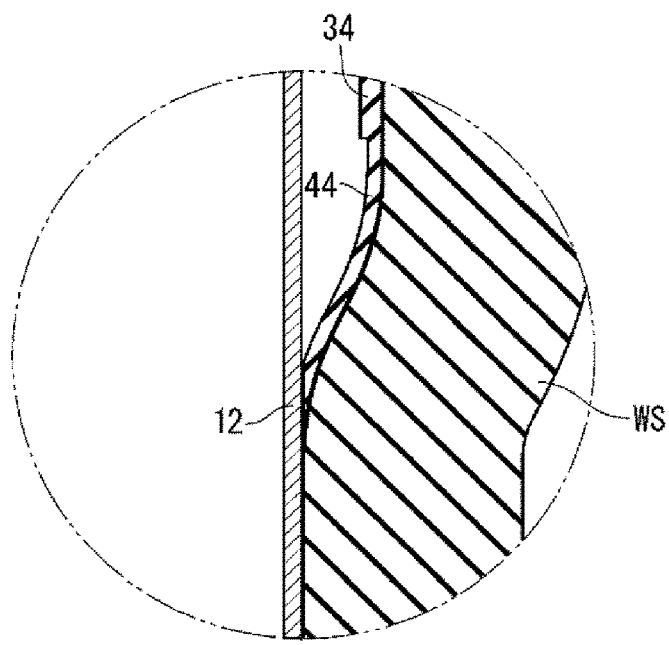
FIG. 9 is an enlarged view of an area A1 of FIG. 8.
Figure 10:
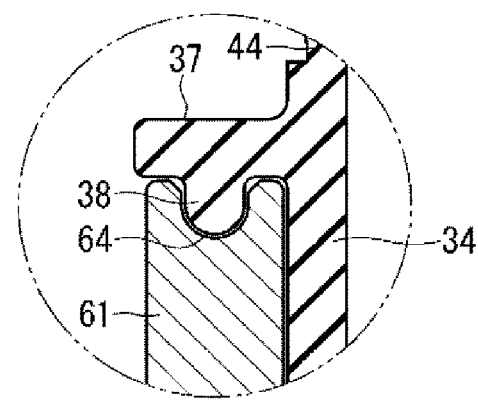
FIG. 10 is an enlarged view of an area A2 of FIG. 9.
Figure 11:
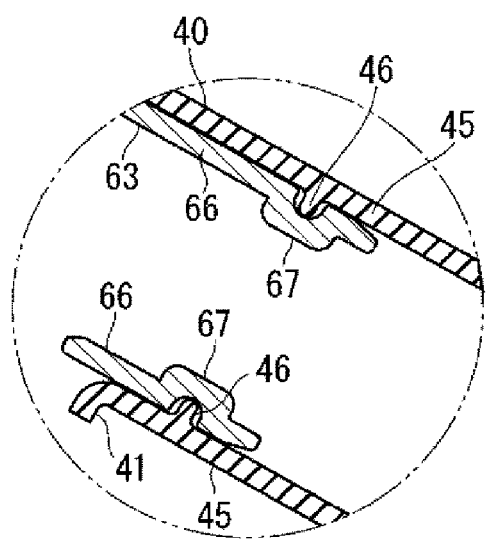
FIG. 11 is an enlarged view of an area A3 of FIG. 5.

Next, the grommet 30 and the protector 60 will be described in detail with reference to FIGS. 6 to 11 in addition to FIGS. 1 to 5. FIGS. 6 and 7 are perspective exploded views of the grommet 30 and the protector 60. FIGS. 6 and 7 are perspective views seen from opposite directions from each other. FIG. 8 is a cross-sectional view cut along line VIII-VIII of FIG. 4. FIG. 9 is an enlarged view of an area A1 of FIG. 8. FIG. 10 is an enlarged view of an area A2 of FIG. 9. FIG. 11 is an enlarged view of an area A3 of FIG. 5.

Grommet

The grommet 30 includes a door attachment portion 31, the protective tube portion 47, and the vehicle body attachment portion 48. Furthermore, the grommet 30 includes the protective portion 50 and a connecting portion 53.

The door attachment portion 31 is the portion attached to the door panel 12. The door attachment portion 31 is attached to the side plate portion 16. The door attachment portion 31 includes the base portion 32, a flange 44, and a connecting portion 45.

The base portion 32 is formed flat. The base portion 32 is attached so as to extend over a surface of the side plate portion 16. The base portion 32 includes a first base portion 33 and a second base portion 39.

The first base portion 33 has a base plate portion 34, a rib 37, and a ridge portion 38. The base plate portion 34 is formed in the shape of a planar plate. In the example shown in FIG. 3, the base plate portion 34 has a pentagonal shape, but may take some other shape. One surface of the base plate portion 34 faces the vehicle body and the other surface faces the door panel 12. The protective tube portion 47 is provided on the one surface of the base plate portion 34. A through hole 35 is formed in the portion of the base plate portion 34 in which the protective tube portion 47 is provided.

The through hole 35 is in communication with the protective tube portion 47. The wiring member 22 passes through the other surface of the base plate portion 34 from the other end to the one end, while passing through the through hole 35 to be guided into the interior of the protective tube portion 47. An annular protrusion 36 is formed on the base plate portion 34 and along the peripheral edge of the through hole 35.

The annular protrusion 36 is formed so that the peripheral edge portion of the through hole 35 of the base plate portion 34 protrudes toward the other surface. The annular protrusion 36 is formed with the same thickness as the other portions of the base plate portion 34. The portion on the one surface of the base plate portion 34 where the annular protrusion 36 is formed is recessed toward the other surface from its surrounding portion. The portion on the other surface of the base plate portion 34 where the annular protrusion 36 is formed protrudes toward the door panel 12 from its surrounding portion.

The rib 37 is provided on the other surface of the base plate portion 34. The rib 37 protrudes from the base plate portion 34 toward the door panel 12. The height dimension of the rib 37 from the base plate portion 34 is approximately the same as the protruding dimension of the annular protrusion 36 from the base plate portion 34. In the base plate portion 34, the rib 37 is provided to extend along the following path. That is, the rib 37 corresponds to one side of the pentagon of the base plate portion 34 and is not provided on the one edge that connects with the second base portion 39. The rib 37 is provided, for the most part, so as to extend along the edges of the base plate portion 34 that correspond to the other four sides of the pentagon. The intermediate portion of the rib 37 is provided so as to extend toward the one edge connected to the second base portion 39 (the edge where the rib 37 is not provided) relative to the through hole 35. As a result, the portion of the rib 37 corresponding to one corner of the pentagonal base plate portion 34 is recessed enough to clear the through hole 35.

The ridge portion 38 is provided on the inner peripheral surface of the rib 37. The ridge portion 38 is provided over the entire length of the rib 37. The ridge portion 38 is provided at an intermediate position along the height direction of the rib 37. The ridge portion 38 is fitted into a recessed groove 64 of the protector 60.

The second base portion 39 includes a base plate portion 40 and a support wall 41. The base plate portion 40 is formed in a flat plate shape. Although the base plate portion 40 has the shape of an isosceles trapezoid in the example shown in FIG. 3, it may have some other shape. One surface of the base plate portion 40 faces the vehicle body and the other surface faces the door panel 12. One edge of the base plate portion 40 is connected to the base plate portion 34. The connecting portion 45 is provided on the edge of the base plate portion 40 that is opposite the edge connected to the base plate portion 34.

The support wall 41 is provided on three edges of the base plate portion 40, except for the edge connected to the base plate portion 34. The support wall 41 protrudes from the base plate portion 40 toward the door panel 12. The dimension of protrusion of the support wall 41 is gradually increased from the edges connected to the base plate portion 34 to the edge where the connecting portion 45 is provided. The dimension of protrusion of the support wall 41 on the edge where the connecting portion 45 is provided is greater than the minor axis of the connecting portion 45. A through hole that is in communication with the connecting portion 45 is formed in the support wall 41. The support wall 41 suppresses bending of the connecting portion 45 and the base plate portion 40 at the boundary therebetween.

The first base portion 33 and the second base portion 39 are connected via a hinge portion 42. The hinge portion 42 is a portion made thinner than the base plate portions 34 and 40. The first base portion 33 and the second base portion 39 are easily bent at the hinge portion 42. With the protector 60 fitted on the grommet 30, the first base portion 33 and the second base portion 39 are restricted from bending at the hinge portion 42 and are maintained in a predetermined position. As shown in FIG. 5, in that predetermined position, they are bent at the hinge portion 42 so that the base plate portions 34 and 40 intersect each other.

Attachment holes 43 are formed in the base portion 32. Bolts, clips, and the like are passed through the attachment holes 43. The base portion 32 is attached to the door panel 12 by fastening or engaging the bolts, clips, and the like, which are passed through the attachment holes 43, with the door panel 12. Here, two attachment holes 43 are formed in the base portion 32. The two attachment holes 43 are formed in the base plate portion 34 of the first base portion 33. Of the two portions of the base plate portion 34 separated by the rib 37, the attachment holes 43 are provided in the one without the through hole 35. The two attachment holes 43 are provided on the upper and lower sides in the vertical direction with respect to the wiring member 22. The two attachment holes 43 are formed on the same side (here, on the outer side along the inner-outer direction of the vehicle) with respect to the weather strip WS.

The flange 44 is formed on the first base portion 33. The flange 44 is formed on the outer edge portion of the base plate portion 34. More particularly, as shown in FIG. 4, the flange 44 is formed to protrude outwardly from the four edges of the base plate portion 34 excluding the edge connected to the base plate portion 40. The flange 44 is formed thinner than the base plate portion 34. The flange 44 is provided on the one surface of the base plate portion 34. The flange 44 protrudes obliquely toward the door panel 12. The flange 44 protrudes from the first base portion 33 further toward the door panel 12 than do the annular protrusion 36 and the rib 37. With the grommet 30 attached to the door panel 12, the flange 44 elastically deforms to conform to the door panel 12 and comes into surface contact with the door panel 12.

The flange 44 is also provided on the portion of the grommet 30 traversed by the weather strip WS. By providing the flange 44 on the portion of the grommet 30 traversed by the weather strip WS, the level difference between the door panel 12 and the grommet 30 is reduced as shown in FIG. 9. As such, a gap is less likely to occur in the area surrounded by the weather strip WS, the door panel 12, and the grommet 30. Here, the weather strip WS traverses the one surface of the base plate portion 34 on the cabin side with respect to the portion where the through hole 35 is formed.

The connecting portion 45 is continuous with the second base portion 39. The connecting portion 45 is provided at the edge of the second base portion 39 opposite the edge that is continuous with the hinge portion 42. The connecting portion 45 is connected to the protective portion 50. When the first base portion 33 and the second base portion 39 are bent at the hinge portion 42, the connecting portion 45 and the protective portion 50 move integrally with the second base portion 39. The connecting portion 45 accommodates a tubular portion 66 of the protector 60. The connecting portion 45 is formed in a tubular shape with a flat transverse cross section. The connecting portion 45 is formed into a tubular shape having a transverse cross-sectional shape similar in size to later-described large-diameter tubular portions 51 of the protective portion 50. The connecting portion 45 is formed longer than the large-diameter tubular portion 51 in the axial direction. The connecting portion 45 is made more difficult to deform than the protective portion 50. An annular protruding portion 46 is provided on the inner surface of the connecting portion 45.

The annular protruding portion 46 is provided on the inner surface of an intermediate portion in the axial direction of the connecting portion 45. The annular protruding portion 46 is provided in an annular shape along the circumferential direction of the connecting portion 45. The annular protruding portion 46 protrudes from the inner surface of the connecting portion 45 toward the center of the connecting portion 45. The annular protruding portion 46 is fitted into an annular recessed portion 67 of the protector 60.

The protective tube portion 47 protrudes from the one surface of the first base portion 33. The protective tube portion 47 is in communication with the through hole 35. The protective tube portion 47 is formed to be flexible. Any configuration may be used to make the protective tube portion 47 flexible. Here, the protective tube portion 47 is formed in a bellows shape to be flexible.

The vehicle body attachment portion 48 is provided at the other end of the protective tube portion 47. Here, the vehicle body attachment portion 48 is provided so as to be able to engage with a through hole formed in the vehicle body.

The protective portion 50 covers the first section of the wiring member 22. The protective portion 50 is formed to be capable of at least one of bending deformation and stretching deformation. Stretching deformation is a deformation that causes the protective portion 50 to change its length in its longitudinal direction. Being capable of stretching deformation means being capable of at least one of elongation deformation and contraction deformation, and it is preferable if at least elongation deformation is possible. Being capable of stretching deformation does not necessarily mean being capable of both elongation deformation and contraction deformation.

Here, the protective portion 50 is provided as part of the grommet 30. Therefore, the protective portion 50 is also made of an elastic material such as an elastomer. This makes the protective portion 50 both capable of bending deformation and stretching deformation. In other words, the protective portion 50 is of a material that is bendable and stretchable. Also here, the protective portion 50 is formed in a bellows configuration along its longitudinal direction and is capable of both bending deformation and stretching deformation. In other words, the protective portion 50 is capable of both bending deformation and stretching deformation in terms of its shape.

Here, the protective portion 50 is formed in a tubular shape. In this way, the protective portion 50 can cover the entire periphery of the wiring member 22. The protective portion 50 is formed in a tubular shape with a flat transverse cross-sectional shape. Notwithstanding, the shape of the protective portion 50 is not limited to this and it can be formed in any shape. For example, the protective portion 50 may be formed in a tubular shape with a circular transverse cross-section. As an additional example, the protective portion 50 may be formed in a sheet shape, a plate shape, or the like, instead of a tubular shape. In this case, the sheet-shaped or plate-shaped protective portion may be provided on either or both of the door panel 12 side and the cabin side of the wiring member 22.

The protective portion 50 has a tubular bellows shape. The protective portion 50 has an alternating series of large-diameter tubular portions 51 and small-diameter tubular portions 52. The protective portion 50 periodically changes in diameter along the longitudinal direction.

The part of the protective portion 50 subjected to bending deformation is referred to as a bent portion. The tubular-bellows-shaped protective portion 50, when deformed by bending, is subjected to deformation as follows, for example. That is, the spacing between adjacent large-diameter tubular portions 51 narrows on the inner perimeter of the bent portion and the spacing between adjacent large-diameter tubular portions 51 widens on the outer perimeter of the bent portion.

The part of the protective portion 50 subjected to elongation deformation is referred to as an elongated portion. The tubular-bellows protective portion 50, when subjected to elongation deformation, is deformed, for example, as follows. That is, deformation occurs such that the connections between the large-diameter tubular portions 51 and the small-diameter tubular portions 52 approach straight lines or the difference in diameter between the large-diameter tubular portions 51 and the small-diameter tubular portions 52 decreases.

The part of the protective portion 50 subjected to contraction deformation is referred to as a contracted portion. When the tubular-bellows protective portion 50 is subjected to contraction deformation, it is deformed, for example, as follows. That is, deformation occurs such that the spacing between adjacent large-diameter tubular portions 51 becomes narrower or the diameter of the large-diameter tubular portions 51 increases.

The section of the wiring member 22 that includes the first section, which is covered by the protective portion 50, is capable of conforming to the deformation of the protective portion 50. Since each electric wire 24 can be deformed by bending, the wiring member 22, which includes the plurality of electric wires 24, also can be deformed by bending. In particular, the bundling of the plurality of electric wires 24 makes it more difficult to inhibit the bending of each electric wire 24 and makes it easier for the wiring member 22 to conform to the bending deformation of the protective portion 50.

If each electric wire 24 is a common electric wire, stretching deformation does not easily occur in the electric wires 24. In this case, the wiring member 22 is made capable of conforming to the stretching deformation of the protective portion 50 in the following manner. That is, when the protective portion 50 is at its natural length, an extra length is provided in the section of the wiring member 22 that includes the first section. When the protective portion 50 is deformed by elongation, this extra length is used to make the wiring member 22 capable of conforming to the elongation deformation of the protective portion 50. Such an extra length can be provided, for example, by making the wiring member 22 longer than the shortest path or by loosely twisting the electric wires into a bundle. When the protective portion 50 is deformed by contraction, the wiring member 22 bends to take a longer path than the previous path, whereby the extra length that occurs in the wiring member 22 can accommodated.

A connecting portion 53 is provided at the leading end of the protective portion 50. The connecting portion 53 is the portion to which the planar member 70 is attached. The connecting portion 53 is formed in a tubular shape having a transverse cross-sectional shape similar in size to the large-diameter tubular portions 51. The connecting portion 53 is formed longer than a large-diameter tubular portion 51 in the axial direction. The connecting portion 53 is more difficult to deform than the protective portion 50.

Protector

The protector 60 includes a base attachment portion 61. The base attachment portion 61 is the portion attached to the base portion 32. Here, the protector 60 further includes the tubular portion 66. The tubular portion 66 is the portion attached to the connecting portion 45. The protector 60 is attached to the grommet 30 by attaching the base attachment portion 61 to the base portion 32 and attaching the tubular portion 66 to the connecting portion 45.

The base attachment portion 61 has a first flat plate portion 62 and a second flat plate portion 63. The first flat plate portion 62 is disposed on the first base portion 33. The first flat plate portion 62 is formed in a flat plate shape. The flat plate shape of the first flat plate portion 62 is formed to match the shape of the portion enclosed by the rib 37, in this case, a recessed shape in which one corner of a pentagon is recessed. The through hole 35 is located where the recessed portion of the first flat plate portion 62 is located. The first flat plate portion 62 is overlaid on the substrate portion 34 of the first base portion 33 so as not to block the through hole 35. One edge of the first flat plate portion 62 is connected to the second flat plate portion 63. A recessed groove 64 is formed in the outer peripheral surface of the other edges of the first flat plate portion 62 excluding that edge. Attachment holes 65 are formed in the first flat plate portion 62. The attachment holes 65 are formed at positions that coincide with the attachment holes 43 formed in the first base portion 33. The bolts, clips, and the like passing through the attachment holes 43 are passed through the attachment holes 65. The attachment holes 43 and 65 are formed so that their central axes are aligned.

The second flat plate portion 63 is disposed on the second base portion 39. The second flat plate portion 63 is formed in flat plate shape. The flat shape of the second flat plate portion 63 is formed in the shape of an isosceles trapezoid. One edge of the second flat plate portion 63 is connected to the first flat plate portion 62. The tubular portion 66 is provided on the edge of the second flat plate portion 63 opposite the edge connected to the first flat plate portion 62. Grooves are formed in the second flat portion 63. The grooves are formed in the side of the second plate portion 63 that faces the door panel 12. The grooves are formed to connect the edge of the second flat plate portion 63 connected to the first flat plate portion 62 with the edges where the tubular portion 66 is provided.

In the base attachment portion 61, the first flat plate portion 62 and the second flat plate portion 63 extend and are bent so that their main surfaces intersect each other. By attaching the base attachment portion 61 to the base portion 32, the base portion 32 is maintained in a bent state. The second section of the wiring member 22 is also maintained in a bent state by extending along the base attachment portion 61. The base attachment portion 61 restricts the bending of the grommet 30 and the path of the wiring member 22.

The tubular portion 66 is accommodated in the connecting portion 45. The tubular portion 66 is fitted in the connecting portion 45. The tubular portion 66 is formed in a tubular shape smaller than the connecting portion 45. The tubular portion 66 is formed in a flat tubular shape that corresponds to the connecting portion 45. The annular recessed portion 67 is formed in the outer peripheral surface of the tubular portion 66. The annular protruding portion 46 formed on the inner peripheral surface of the connecting portion 45 fits into the annular recessed portion 67. A connecting piece is also provided on the outside of the opening of the tubular portion 66. The connecting piece is formed to fill the gap between the surface of the second flat portion 63 facing the door panel and the opening of the tubular portion 66. When the tubular portion 66 is inserted into the connecting portion 45, the connecting piece comes into contact with the portion of the support wall 41 located on the peripheral edge of the opening of the connecting portion 45 so as to suppress excessive insertion of the two.

The wiring member 22 passes along the door panel 12 side of the base attachment portion 61 with respect to the protector 60 and through the tubular portion 66. As shown in FIG. 5, the protector 60 is interposed between the portion on the grommet 30 traversed by the weather strip WS and the door panel 12. The protector 60 is located on the weather strip WS side opposite the wiring member 22. The protector 60 supports the deformation of the weather strip WS in the closed state.

Attachment of Grommet and Protector

Figure 12:
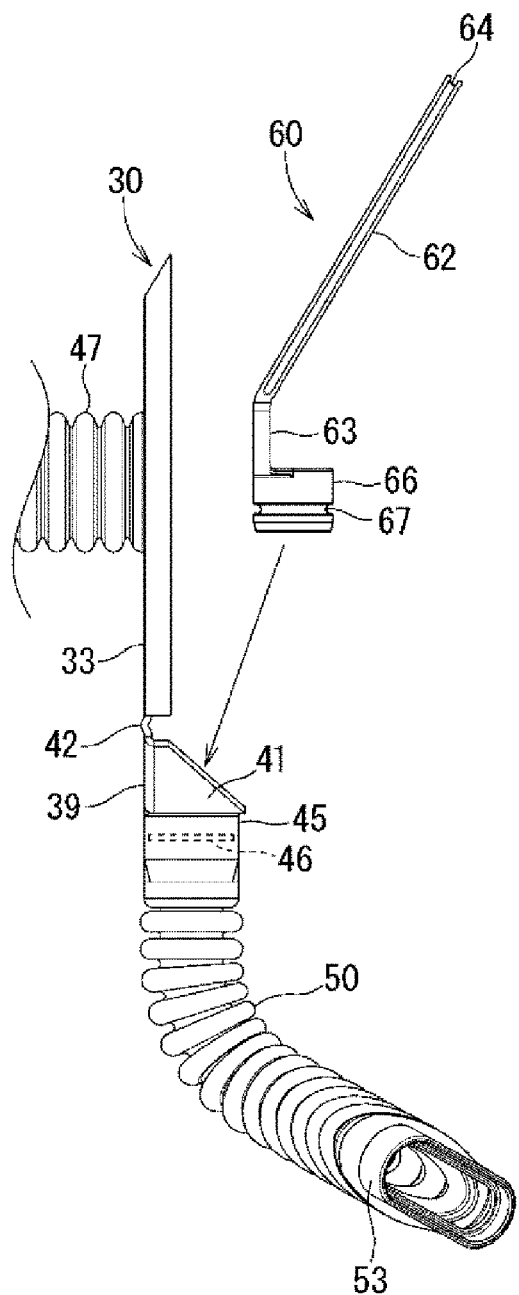
FIG. 12 is an explanatory view that illustrates how the grommet and the protector are attached.
Figure 13:
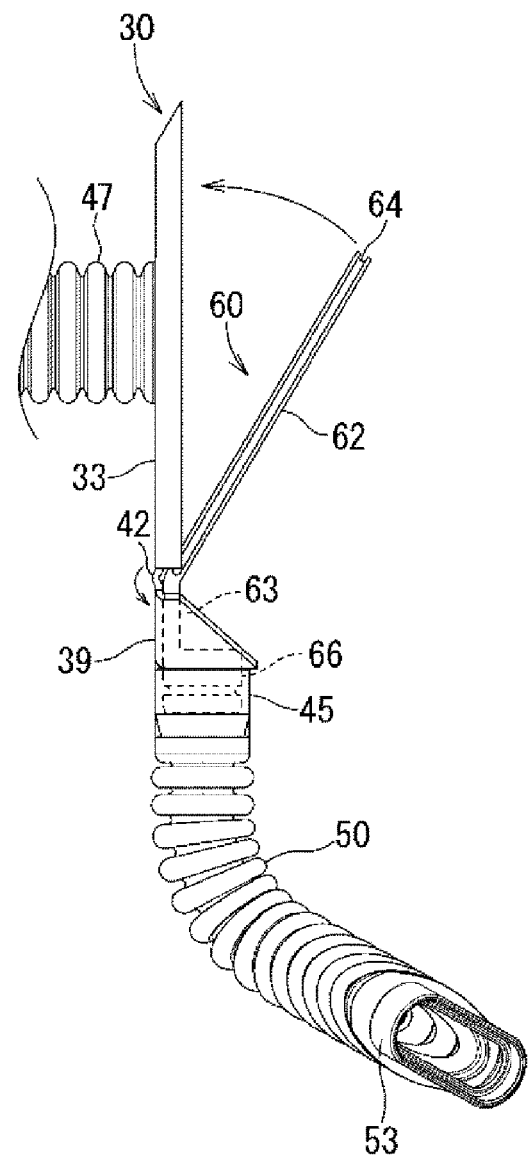
FIG. 13 is an explanatory view that illustrates how the grommet and the protector are attached.
Figure 14:
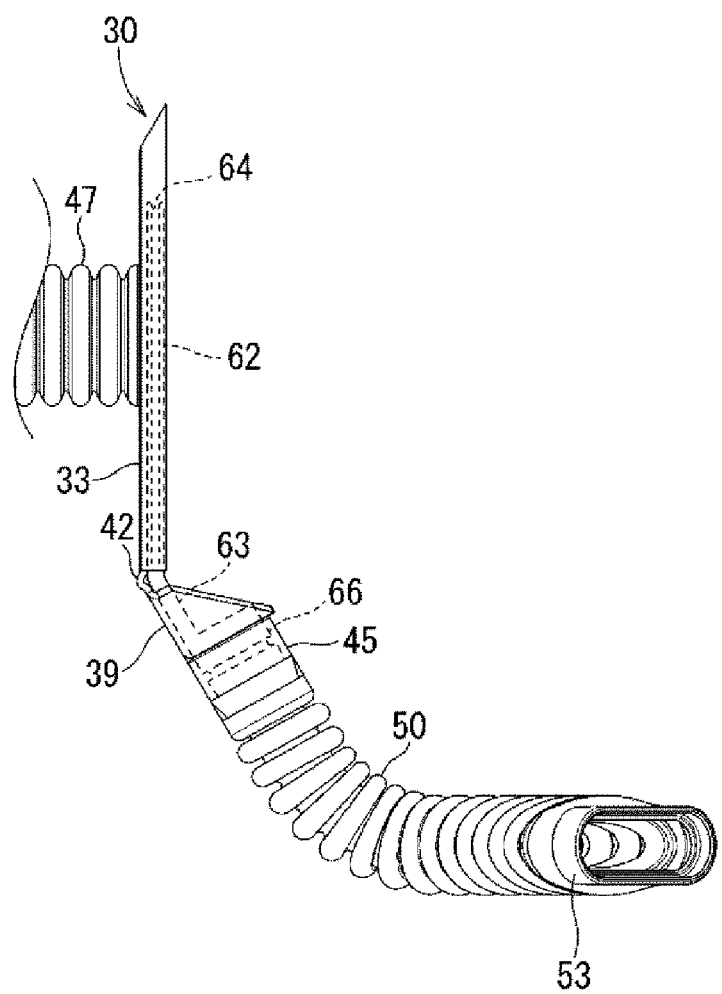
FIG. 14 is an explanatory view that illustrates how the grommet and the protector are attached.

Here, the grommet 30 and the protector 60 can be attached after being molded separately. The manner in which the grommet 30 and the protector 60 are attached will be described in detail with reference to FIGS. 12 to 14. FIGS. 12 to 14 are explanatory views that illustrate how the grommet 30 and the protector 60 are attached.

First, as shown in FIG. 12, the tubular portion 66 of the protector 60 is inserted into the connecting portion 45 of the grommet 30. At this time, in the example shown in FIG. 12, the grommet 30 is in an open position in which the base plate portions 34 and 40 are parallel to each other. In this way, when the base plate portions 34 and 40 of the grommet 30 are in a more outwardly open position than the predetermined bent position, the tubular portion 66 can be easily inserted.

When the tubular portion 66 is inserted into the connecting portion 45, the leading end of the tubular portion 66 comes into contact with the annular protruding portion 46. Then, the diameter of the annular protruding portion 46 of the grommet 30 expands while the tubular portion 66 continues to be inserted. When the annular recessed portion 67 reaches the annular protruding portion 46, the annular protruding portion 46 of the grommet 30 is restored to its original state and the annular protruding portion 46 fits into the annular recessed portion 67. The tubular portion 66 is attached to the connecting portion 45 by fitting the annular protruding portion 46 formed on the inner peripheral surface of the connecting portion 45 into the annular recessed portion 67 formed in the outer peripheral surface of the tubular portion 66. As a result, as shown in FIG. 13, the tubular portion 66 is accommodated in the connecting portion 45, and the second flat plate portion 63 extends along the base plate portion 40 of the second base portion 39. Also, the first flat plate portion 62 of the protector 60 is separated from the base plate portion 34 of the first base portion 33. With the tubular portion 66 attached to the connecting portion 45, when the connecting portion 45 is elastically deformed to be slightly expanded by the tubular portion 66, the connecting portion 45 tightens on the tubular portion 66 due to its restoring force, and thus the connecting portion 45 and the tubular portion 66 are not easily detached from each other and rattling is less likely to occur.

Subsequently, as shown in FIG. 13, when the first flat plate portion 62 is brought closer to the base plate portion 34 of the first base portion 33, the grommet 30 bends at the hinge portion 42. The first base portion 33 and the other portions of the grommet 30 provided on the protective tube portion 47 side relative to the first base portion 33 do not move in a linked manner with the movement of the protector 60, but the second base portion 39 and the other portions of the grommet 30 provided on the protective sleeve portion 50 side relative to the second base portion 39 move integrally with the protector 60. When the first flat plate portion 62 approaches the base plate portion 34, the ridge portion 38 of the rib 37 comes into contact with the outer edges of the first flat portion 62. Then, the rib 37 bends outwardly from its base end portion on the base plate portion 34, while the first flat plate portion 62 continues to be brought closer to the base plate portion 34. When the recessed groove 64 reaches the ridge portion 38, the rib 37 of the grommet 30 is restored to its original state, and the ridge portion 38 fits into the recessed groove 64. The ridge portion 38 formed on the inner peripheral surface of the rib 37 fits into the recessed groove 64 formed in the outer peripheral surface of the base attachment portion 61, and the base attachment portion 61 and the base portion 32 are attached to each other as shown in FIG. 14. With the base portion 32 attached to the base attachment portion 61, when the base portion 32 is elastically deformed to be slightly expanded by the base attachment portion 61, the base portion 32 tightens on the base attachment portion 61 due to its restoring force, and thus the base portion 32 and the base attachment portion 61 are not easily detached from each other and rattling is less likely to occur.

The protector 60 is attached to the grommet 30 as above. In this state, as shown in FIG. 14, the first base portion 33 and the second base portion 39 of the grommet 30 are kept bent at the hinge portion 42.

Planar Member

The planar member 70 extends along the inner plate portion 15 of the door panel 12. The planar member 70 is an example of a fixing component that fixes the leading end portion of the protective portion 50 to the door panel 12. The planar member 70 is a molded article made of a resin, metal, or the like. The planar member 70 has a main plate portion 72 and a protective portion attachment portion 74.

The main plate section 72 holds the fourth section of the wiring member 22, which extends along the inner plate portion 15 of the door panel 12. The main plate portion 72 is a portion extending in a plate shape that is large enough to close the opening formed in the inner plate portion 15. For example, the peripheral edge of the main plate portion 72 is attached at multiple portions to the inner panel 14 by means of screwing or engagement structures. Here, the wiring member 22 is disposed on the surface of the main plate portion 72 that faces the inside of the vehicle. The wiring member 22 may also be disposed on the surface of the main plate portion 72 that faces the outside of the vehicle. The wiring member 22 may also be disposed on both surfaces of the main plate portion 72, that is, the surface facing the inside of the vehicle and the surface facing the outside of the vehicle. The surface of the main plate portion 72 on which the wiring member 22 is disposed will be referred to as a disposition surface 73 hereinafter. Here, the disposition surface 73 is flat. The disposition surface 73 may also be formed in a protruding and recessed shape. The portion of the disposition surface 73 covering the opening may be recessed toward the outside of the vehicle compared to the portion covering the peripheral edge of the opening, and may extend into the opening. The path of the disposition surface 73 along which the wiring member 22 is disposed may be flat. The disposition surface 73 may have a protruding and recessed shape at a portion extending along the path along which the wiring member 22 is disposed.

The protective portion attachment portion 74 is provided at a portion of the peripheral edge of the main plate portion 72. Here, the protective portion attachment portion 74 is provided on the part of the peripheral edge of the main plate portion 72 that is close to the door hinge. The leading end portion of the protective portion 50 is attached to the protective portion attachment portion 74. Here, the protective portion attachment portion 74 extends forward (toward the door hinges) and downward from the main plate portion 72. The protective portion attachment portion 74 may extend in any direction from the main plate portion 72. The protective portion attachment portion 74 is inserted into the connecting portion 53. The protective portion attachment portion 74 is formed in the shape of a planar plate. The width dimension of the protective portion attachment portion 74 is the same as or smaller than the inner diameter along the major axis at the portion of the connecting portion 53 where the annular protruding portion 54 is not provided. The width dimension of the protective portion attachment portion 74 is greater than the inner diameter along the major axis at the portion of the connecting portion 53 where the annular protruding portion 54 is provided. Recessed portions 75 are formed in the two widthwise sides of the protective portion attachment portion 74. The connecting portion 53 is attached to the protective portion attachment portion 74 with the annular protruding portion 54 of the connecting portion 53 fitted in the recessed portions 75 of the protective portion attachment portion 74. The connecting portion 53, which is attached to the protective portion attachment portion 74, is maintained in a predetermined position relative to the door panel 12 by the attachment of the planar member 70 to the inner panel 14.

The two widthwise sides of the protective portion attachment portion 74 are thicker than the intermediate portion. As a result, the rigidity of the two sides of the protective portion attachment portion 74 that are attached to the connecting portion 53 is increased, while a case is suppressed in which the path of the wiring member 22 is narrowed at the intermediate portion through which the wiring member 22 passes. The protective portion attachment portion 74 may be formed in a tubular shape similar to the tubular portion 66.

Attachment of Grommet and Planar Member

Figure 15:
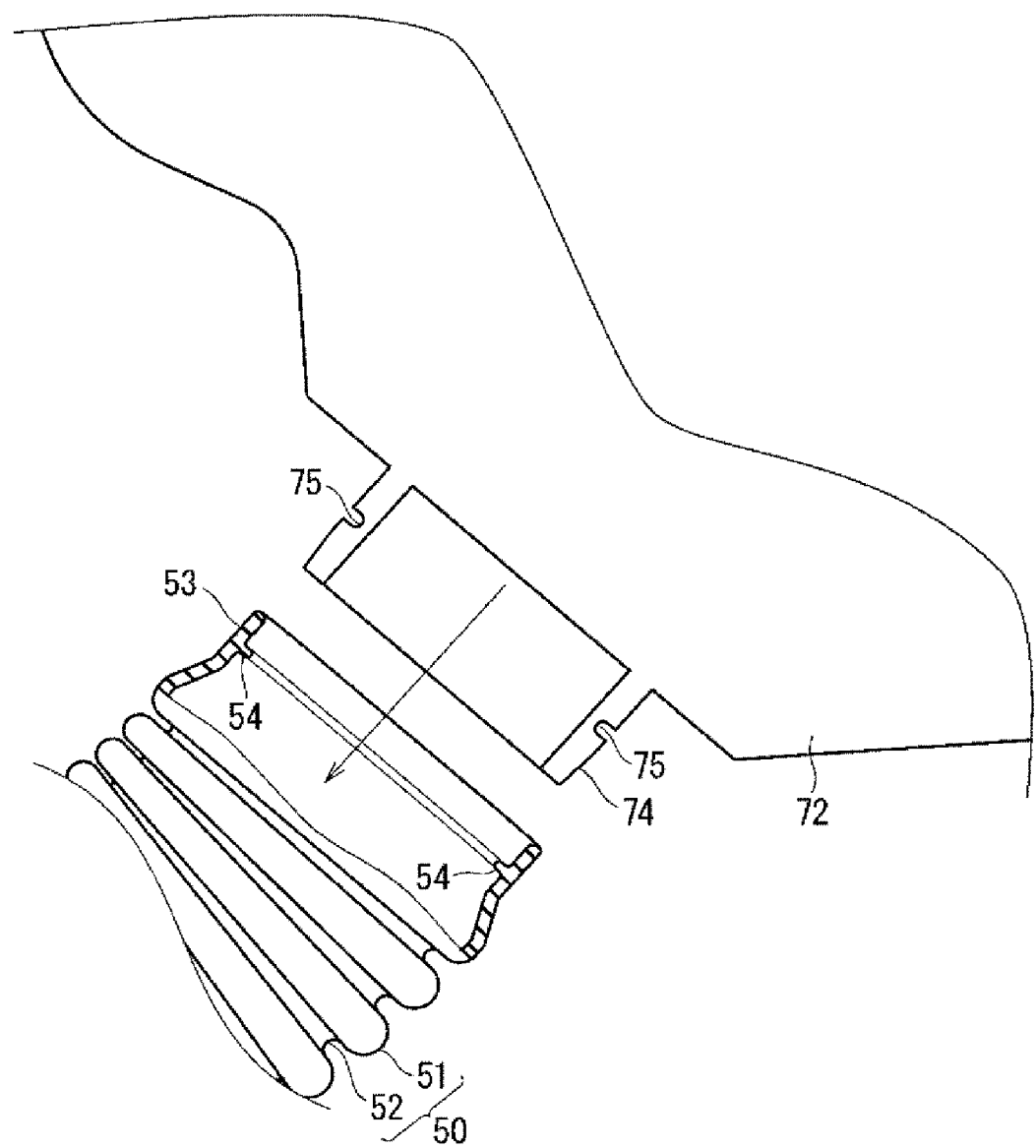
FIG. 15 is an explanatory view that illustrates how the grommet and a planar member are attached.
Figure 16:
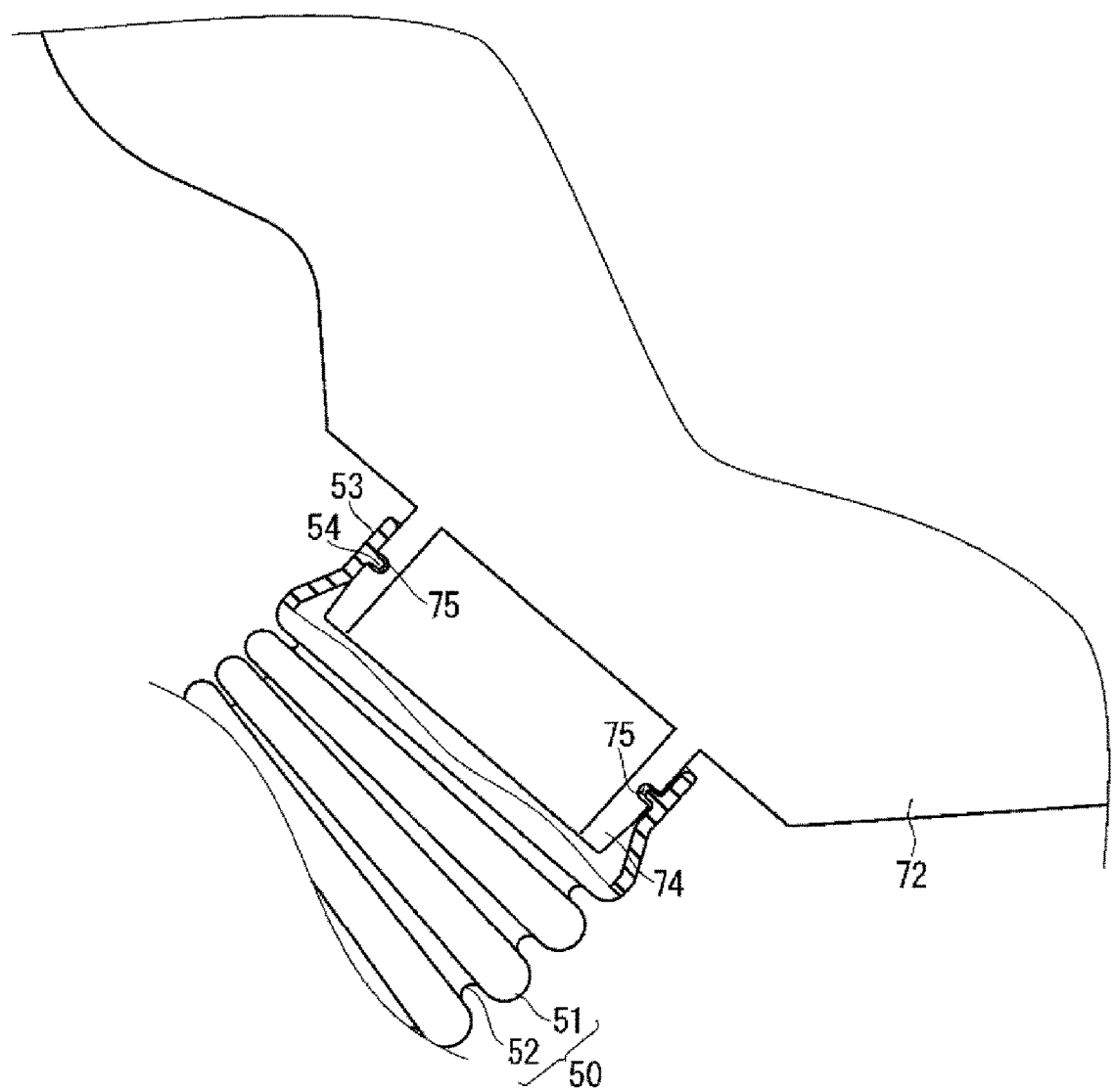
FIG. 16 is an explanatory view that illustrates how the grommet and the planar member are attached.

Here, the grommet 30 and the protector 70 can be attached after being molded separately. FIGS. 15 and 16 are explanatory views that illustrate how the grommet 30 and the planar member 70 are attached. FIGS. 15 and 16 show a portion of the grommet 30 in cross-section.

First, as shown in FIG. 15, the protective portion attachment portion 74 of the planar member 70 is inserted into the connecting portion 53 of the grommet 30. When the protective portion attachment portion 74 is inserted into the connecting portion 53, the leading end of the protective portion attachment portion 74 comes into contact with the annular protruding portion 54. Then, the diameter of the annular protruding portion 54 of the connecting portion 53 expands while the protective portion attachment portion 74 continues to be inserted. When the recessed portions 75 reach the annular protruding portion 54, the annular protruding portion 54 of the grommet 53 is restored to its original state and the annular protruding portion 54 fits into the recessed portions 75. The protective portion attachment portion 74 is attached to the connecting portion 53 by fitting the annular protruding portion 54 formed on the inner peripheral surface of the connecting portion 53 into the recessed portions 75 formed in the outer peripheral surface of the protective portion attachment portion 74. As a result, as shown in FIG. 16, the protective portion attachment portion 74 is accommodated in the connecting portion 53. In the attached state, when the connecting portion 53 is elastically deformed to be slightly expanded by the protective portion attachment portion 74, the connecting portion 53 tightens on the protective portion attachment portion 74 due to its restoring force, and thus the connecting portion 53 and the protective portion attachment portion 74 are not easily detached from each other and rattling is not likely to occur.

Attachment of Wiring Module to Door Panel

Figure 17:
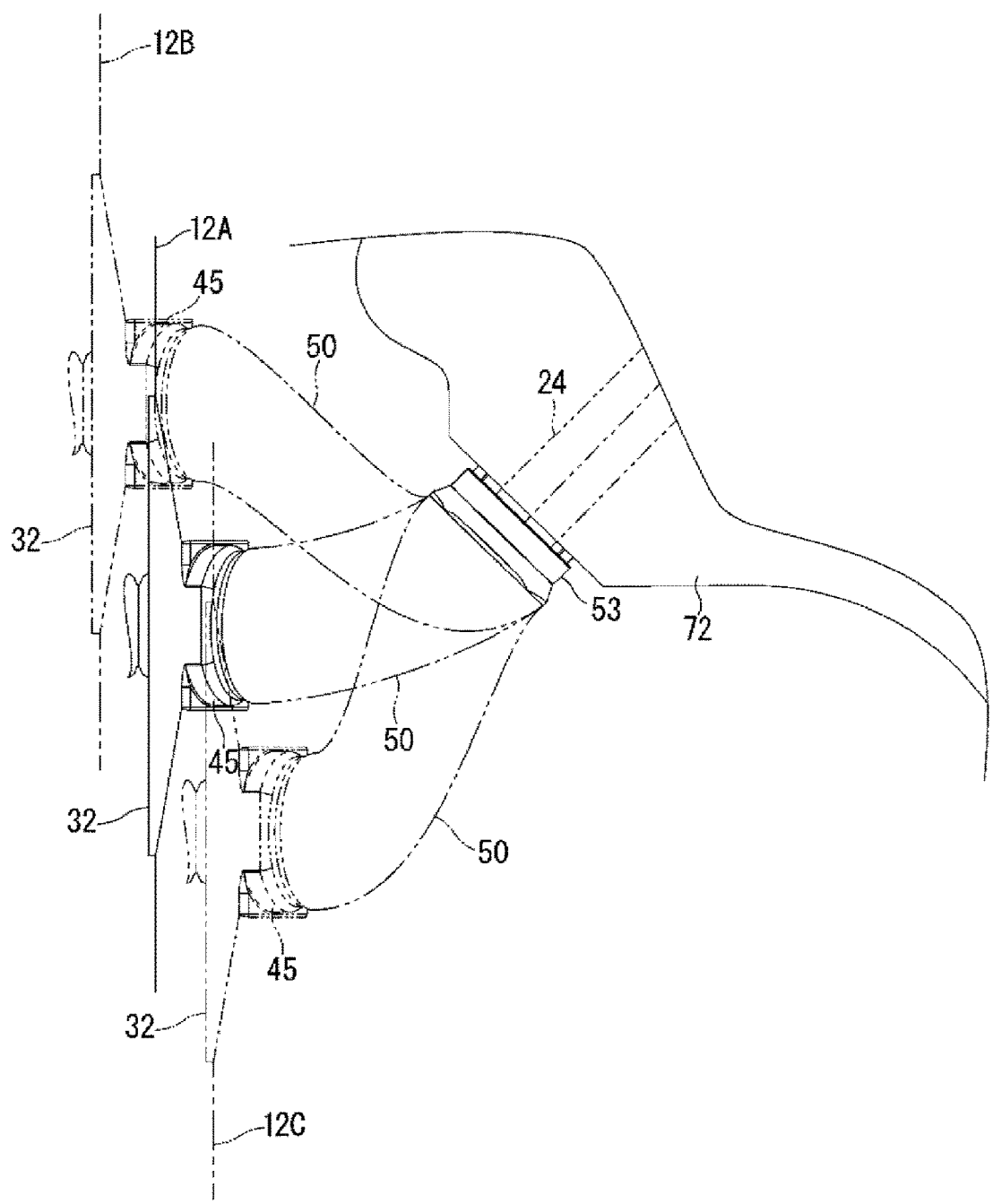
FIG. 17 is an explanatory view illustrating an example of the attachment of the wiring module to the door panel.

FIG. 17 is an explanatory view illustrating an example of the attachment of the wiring module 20 to the door panel 12. In the example shown in FIG. 17, for ease of understanding, the main part is extracted and the protective portion 50 is indicated by two-dot chain lines. In the description of the example shown in FIG. 17, it is assumed that the planar member 70 is attached to three door panels 12A, 12B, and 12C at the same position while the grommet 30 is attached to different positions.

For example, in FIG. 17, the assembly position of the grommet 30 indicated by solid lines is the standard assembly position specified for the wiring module 20, and the assembly positions of the grommet 30 shown in chain double-dashed lines are those deviated from the standard assembly position. As such, the assembly positions deviated from the standard assembly position can be accommodated by causing one of bending deformation and stretching deformation in the protective portion 50. This enables accommodation of differences in assembly positions of the grommet 30 due to different vehicle models, grades, and the like.

In the examples shown in FIG. 17, an assembly position deviated upward and forward from the standard assembly position and an assembly position deviated downward and rearward from the standard assembly position are shown as assembly positions deviated from the standard assembly position. Of course, these assembly positions deviated from the standard assembly position are examples only, and other positions can also be accommodated. Forward and rearward directions, left and right directions, upper and lower directions relative to the vehicle, and any combinations thereof are envisioned as directions in which assembly positions may be deviated from the standard assembly position.

Advantageous Effects, Etc. of Embodiment 1

If the position where the grommet 30 is attached to the door panel 12 is changed, the length of the section of the wiring member 22 extending from the grommet 30 toward the inner plate portion 15 changes, or the portion bent in the section extending from the grommet 30 toward the inner plate portion 15 changes. According to the wiring module 20, the first section of the wiring member 22 is covered by the protective portion 50, which is capable of at least one of bending deformation and stretching deformation. Therefore, even if the position at which the grommet 30 is attached changes among the door panels 12A, 12B, and 12C, the protective portion 50 can accommodate the difference in position by deforming, and thus it is possible to increase the versatility of the wiring module 20.

Furthermore, the protective portion 50 is formed in a tubular shape. As a result, the entire periphery of the first section can be covered by the protective portion 50 so as to improve the protection performance of the first section.

Also, the protective portion 50 is formed in a bellows shape along its longitudinal direction and is capable of both bending deformation and stretching deformation. This makes it easy to accommodate different positions at which the grommet 30 is attached to the door panel 12.

Moreover, the protective portion 50 is provided as part of the grommet 30 so as to extend from the base portion 32. In this way, the protective portion 50 does not have to be a separate member from the grommet 30, and thus it is possible to suppress an increase in the number of parts.

Additionally, the base attachment portion 61 and the base portion 32 are attached to each other by fitting the ridge portion 38 formed on the inner peripheral surface of the rib 37 of the base portion 32 into the recessed groove 64 formed in the outer peripheral surface of the base attachment portion 61. This facilitates the attachment of the protector 60 and the base portion 32.

The protector 60 further includes the tubular portion 66, which is provided on a portion of the peripheral edge of the base attachment portion 61 and fits into the connecting portion 45. This makes it more difficult for the protector 60 to detach from the grommet 30 when the protective portion 50 is deformed.

Moreover, the tubular portion 66 and the connecting portion 45 are attached to each other by fitting the annular protruding portion 46 formed on the inner peripheral surface of the connecting portion 45 into the annular recessed portion 67 formed in the outer peripheral surface of the tubular portion 66. This facilitates the attachment of the tubular portion 66 and the connecting portion 45.

Moreover, the leading end portion of the protective portion 50 is positioned on the door panel 12 via the fixing component. As a result, the base end portion of the protective portion 50 is fixed to the door panel 12 via the base portion 32, while the leading end portion is fixed to the door panel 12 via the fixing component. This facilitates the deformation of the protective portion 50 when one of the base portion 32 and the fixing component is first fixed to the door panel 12 and then the other of the base portion 32 and the fixing component is fixed to the door panel 12.

Further, the portion of the wiring member 22 that extends along the door panel 12 is held by the grommet 30 and the planar member 70. As a result, most of the portion of the wiring member 22 that extends along the door panel 12 extends along a predetermined path, and thus it is possible to achieve an improvement in the assemblability of the wiring member 22.

Additionally, the protective portion 50 is capable of at least stretching deformation, and when the protective portion 50 is at its natural length, the section of the wiring member 22 that includes the first section has an extra length. As a result, the first section is longer than the natural length of the protective portion 50, and the wiring member 22 can easily accommodate the expansion and contraction of the protective portion 50.

Variations

Figure 18:
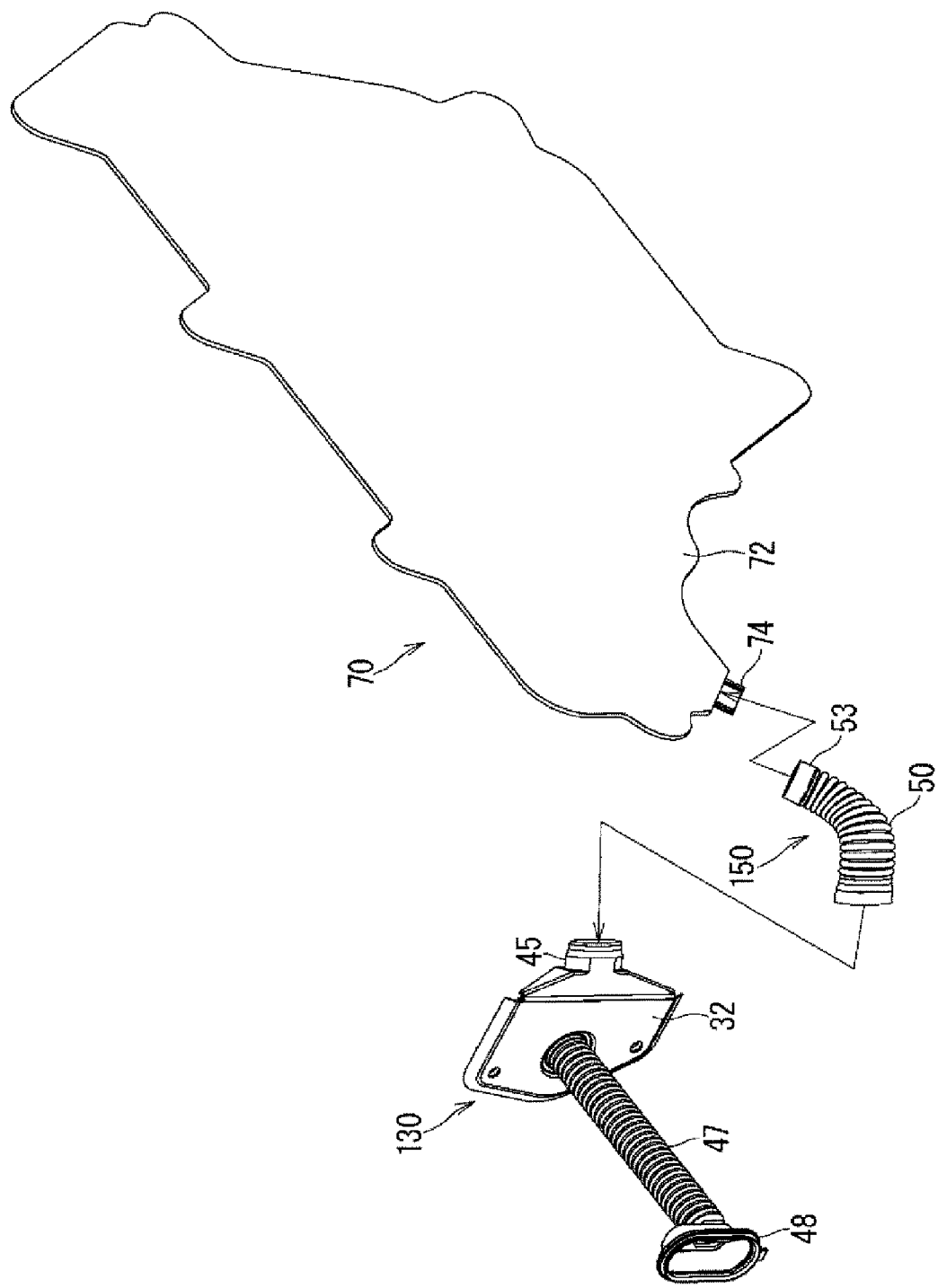
FIG. 18 is a perspective view showing a variation of the wiring module according to Embodiment 1.

FIG. 18 is a perspective view showing a variation of the wiring module 20 according to Embodiment 1. Although the protective portion 50 has been described so far as being provided as part of the grommet 30, this is not an essential configuration. As shown in FIG. 18, a grommet 130 may not be provided with the protective portion 50. In this case, a protective member 150 including the protective portion 50 may be provided separately from the grommet 130. In this way, the protective portion 50 does not have to be integral with the grommet 130, and thus it is possible to suppress a case in which the shape of the grommet 130 becomes complex.

In this case, the grommet 130 may be formed in the shape of the above-described grommet 30 minus the protective portion 50 and the connecting portion 53. A connecting portion 45 is preferably formed in the grommet 130, and the tubular portion 66 of the protector 60 is preferably accommodated in the connecting portion 45.

The protective member 150 may be made of an elastic material or resin, similar to the grommets 30 and 130. The protective member 150 may be a corrugated tube or the like. One end of the protective member 150 is preferably attached to the grommet 130 or the protector 60. The grommet 130 or the protector 60 is preferably provided with a protective member attachment portion. For example, the connecting portion 45 may be extended in the axial direction, and the protective member 150 may be inserted into the connecting portion 45 in the direction opposite to the direction in which the protector 60 is inserted, thus making the connecting portion 45 a protective member attachment portion. The other end of the protective member 150 is preferably attached to the planar member 70. The above-described connecting portion 53 may be provided in the protective member 150 and attached to the protective portion attachment portion 74 of the planar member 70.

Additionally, although the base attachment portion 61 and the base portion 32 have been so far described as being attached to each other by fitting the ridge portion 38 formed on the inner peripheral surface of the rib 37 of the base portion 32 into the recessed groove 64 formed in the outer peripheral surface of the base attachment portion 61, this is not an essential configuration. The base attachment portion and the base portion may be attached to each other by fitting a ridge portion formed on the outer peripheral surface of the base attachment portion into a recessed groove formed in the inner peripheral surface of the rib of the base portion.

Also, the protector 60 has been described so far as including the tubular portion 66, which is fitted into the connecting portion 45 of the grommet 30, but this is not an essential configuration. The protector may include, instead of the tubular portion 66, a plate-shaped attachment portion, similar to the protective portion attachment portion 74 of the planar member 70. The connecting portion of the grommet may also fit in the tubular portion of the protector.

Moreover, the tubular portion 66 and the connecting portion 45 have been described so far as being attached to each other by fitting the annular protruding portion 46 formed on the inner peripheral surface of the connecting portion 45 into the annular recessed portion 67 formed in the outer peripheral surface of the tubular portion 66, but this is not an essential configuration. The tubular portion and the connecting portion may be attached to each other by fitting an annular protruding portion formed on the outer peripheral surface of the tubular portion into an annular recessed portion formed in the inner peripheral surface of the connecting portion.

Although the wiring module 20 has been described so far as having the fixing component, this is not an essential configuration. The wiring module does not have to include a fixing component. Also, although the fixing component has been described as being the planar member 70, this is not an essential configuration. For example, the fixing component may be a band clamp. The band clamp may be attached by being wrapped around the connecting portion 45.

It should be noted that the configurations described in the foregoing embodiments and the variations can be combined as appropriate as long as they are compatible with one another.

LIST OF REFERENCE NUMERALS

10 Door
12 Door panel
13 Outer panel
14 Inner panel
15 Inner plate portion
16 Side plate portion
20 Wiring module
22 Wiring member
24 Electric wire
30 Grommet
31 Door attachment portion
32 Base portion;
33 First base portion;
34 Base plate portion
35 Through hole
36 Annular protrusion
37 Rib
38 Ridge portion
39 Second base portion
40 Base plate portion
41 Support wall
42 Hinge portion
43 Attachment hole
44 Flange
45, 53 Connecting portion
46, 54 Annular protruding portion
47 Protective tube portion
48 Vehicle body attachment portion
50 Protective portion
51 Large-diameter tubular portion
52 Small-diameter tubular portion
60 Protector
61 Base attachment portion
62 First flat plate portion
63 Second flat plate portion
64 Recessed groove
65 Attachment hole
66 Tubular portion
67 Annular recessed portion
70 Planar member
72 Main plate portion
73 Disposition surface
74 Protective portion attachment portion
75 Recessed portion
C1, C2 Connector
WS Weather strip

What is claimed is:

1. A wiring module, comprising:
a wiring member connecting a vehicle body and a door panel;
a grommet attached to the wiring member; and
a protector that is more rigid than the grommet and is attached to the grommet,
wherein the grommet includes a base portion fixed at a certain position with respect to the door panel,
the wiring member includes a first section and a second section that is located on a vehicle body side relative to the first section and is covered by the base portion,
the first section of the wiring member is covered by a protective portion capable of at least one of bending deformation and stretching deformation,
the protector includes a base attachment portion attached to the base portion,
the base portion includes a base plate portion extending along the door panel and a rib protruding toward the door panel from a surface of the base plate portion that faces the door panel,
the base attachment portion is formed in a flat plate shape corresponding to the base plate portion, and
the base attachment portion and the base portion are attached to each other by fitting a ridge portion formed on one of an outer peripheral surface of the base attachment portion and an inner peripheral surface of the rib of the base portion into a recessed groove formed in the other.

2. The wiring module according to claim 1, wherein the protective portion is formed in a tubular shape.

3. The wiring module according to claim 1, wherein the protective portion is formed in a bellows shape along its longitudinal direction and is capable of both bending deformation and stretching deformation.

4. The wiring module according to claim 1, wherein the protective portion is provided as part of the grommet so as to extend from the base portion.

5. The wiring module according to claim 1, further comprising a protective member that is a separate member from the grommet and includes the protective portion.

6. The wiring module according to claim 1,
wherein the grommet further includes a tubular connecting portion that connects the base portion and the protective portion, and the protector further includes a tubular portion that is provided on a portion of a peripheral edge of the base attachment portion and fits into the connecting portion.

7. The wiring module according to claim 6, wherein the tubular portion and the connecting portion are attached to each other by fitting an annular protruding portion formed on one of an outer peripheral surface of the tubular portion and an inner peripheral surface of the connecting portion into an annular recessed portion formed in the other.

8. The wiring module according to claim 1, further comprising a fixing component for positioning a leading end portion of the protective portion on the door panel.

9. The wiring module according to claim 8,
wherein the fixing component is a planar member that extends along an inner plate portion of the door panel, and
the planar member includes a main plate portion that holds a section of the wiring member that extends along the inner plate portion, and a protective portion attachment portion that is provided on a portion of a peripheral edge of the main plate portion and to which the leading end portion of the protective portion is attached.

10. The wiring module of claim 1,
wherein the protective portion is capable of at least stretching deformation, and
when the protective portion is at its natural length, an extra length occurs in a section of the wiring member that includes the first section.

\* \* \* \* \*